July 16, 1963 J. H. LEMELSON 3,098,119

INFORMATION STORAGE SYSTEM

Filed Jan. 12, 1959 7 Sheets-Sheet 1

INVENTOR.
Jerome H. Lemelson
BY William Golman
ATTORNEY

July 16, 1963 J. H. LEMELSON 3,098,119

INFORMATION STORAGE SYSTEM

Filed Jan. 12, 1959 7 Sheets-Sheet 2

*INVENTOR.*

Jerome H. Lemelson

*BY*

William Grolman

*ATTORNEY*

July 16, 1963 J. H. LEMELSON 3,098,119

INFORMATION STORAGE SYSTEM

Filed Jan. 12, 1959 7 Sheets-Sheet 3

INVENTOR.
Jerome H. Lemelson
BY
William Grobman
ATTORNEY

July 16, 1963 J. H. LEMELSON 3,098,119

INFORMATION STORAGE SYSTEM

Filed Jan. 12, 1959 7 Sheets-Sheet 4

INVENTOR.
Jerome H. Lemelson
BY William Grolman
ATTORNEY

INVENTOR.
Jerome H. Lemelson
BY
William Golman
ATTORNEY

July 16, 1963 J. H. LEMELSON 3,098,119

INFORMATION STORAGE SYSTEM

Filed Jan. 12, 1959 7 Sheets-Sheet 6

INVENTOR.

Jerome H. Lemelson

BY

William Golan

ATTORNEY

July 16, 1963 J. H. LEMELSON 3,098,119

INFORMATION STORAGE SYSTEM

Filed Jan. 12, 1959 7 Sheets-Sheet 7

INVENTOR.
Jerome H. Lemelson
BY
William Grolman
ATTORNEY

United States Patent Office 3,098,119
Patented July 16, 1963

3,098,119
INFORMATION STORAGE SYSTEM

Jerome H. Lemelson, 43A Garfield Apts., Metuchen, N.J.
Filed Jan. 12, 1959, Ser. No. 786,324
14 Claims. (Cl. 178—6.6)

This invention relates to apparatus for the storage and retrieval of pictorial information and is a continuation-in-part of my co-pending applications, Serial Numbers 765,401 filed on October 6, 1958, 544,991 now Patent No. 2,959,636 and 668,348 filed on June 27, 1957, 515,417 now Patent No. 3,003,109.

In storing and retrieving pictorial information a considerable amount of human effort is devoted to the physical actions required to position or store said information in predetermined locations of a storage file or the like, removal of said information from said file and the transport thereof to the person requiring the information. In my said co-pending applications I have provided mechanized storage and retrieval systems wherein pictorial or other types of recorded information is photographically or magnetically recorded on recording means in a system which is provided with means for the automatic derivation and remote viewing of said information without the need for human effort to select and transport said information other than the remote operation of a scanning selection input apparatus. This invention is concerned with further improvements in the design of the storage and retrieval apparatus of an automatic information storage system. In my said co-pending application, Serial Number 765,401 means are provided whereby a plurality of observers may view a reproduction of the same document image frame or otherwise recorded area of image information as it passes a common scanning means, said image frame being available for monitoring only during the pre-determined interval when it passes a particular scanning means in a system having a plurality of fixed scanning means. This invention employs a plurality of scanning means each of which is remotely positionable so that it may be used to scan selected of a plurality of information tracks which are moving therepast. The control and operation of each scanning means may be effected by any one of a plurality of observers. Each observer is situated at a monitor screen comprising one of a plurality at a respective of plural monitoring stations. An observer seeking to monitor particular information contained on a recording area located along a particular longitudinal column or image strip in the system may do so in an access time which is proportioned to the number of monitor stations in use and less than that required of a system such as provided in my said co-pending application Serial Number 765,401 in which cycling of the moving information columns may be required before deriving an image or reproduction of a document contained on a particular recording area or frame thereof.

The storage means of this invention comprises a plurality of moving information columns preferably in the form of a single flexible mount such as a belt, and a plurality of scanning transducers such as video scanning means each of which is movable in a direction lateral to the direction of movement of said information columns and is remotely positionable by an observer located at a receiving means or monitor station to scan a selected of said multiple information columns to selectively monitor from any column thereof which may contain a frame or recording of the desired information or document. Selection of the individual scanners by the observer which scanners are positioned at different longitudinal positions along the length of said information containing means, may be employed to advantage by the observer to substantially reduce the access time necessary to derive specific information contained on a predetermined area thereof. Furthermore, by providing means for laterally positioning each transducer relative to a selected track of a plural column information storage conveyor additional tracks or columns may be added to the system without the need for providing additional scanning means.

Accordingly, it is a primary object of this invention to provide a new and improved information storage system in which a large volume of information may be stored which information is accessible by remotely controlled means in a relatively short period of time.

Another object is to provide a new and improved information storage system for storing millions of image frames any one of which may be selected for optical scanning or observation by a plurality of different observers each of whom may derive an image of the same frame simultaneously as other observers on a monitoring means without interference to or from said others at a time shortly after the same image frame is derived by any of the others.

Another object is to provide an improved information storage system which consists of a mechanized storage and retrieval system for the storage of millions of frames of pictorial information in a relatively small space from which any of said frames may be selectively scanned and reproduced at a plurality of different observation or monitor stations almost simultaneously, with the image of any frame capable of being simultaneously monitored at a plurality of monitor stations which are situated remote from the location where said frames are stored.

Another object is to provide a new and improved image storage system which may be utilized as an automatic library or the like and which does not require the physical removal of information from a storage means thereof for scanning any of the information in said system.

Another object is to provide an information storage and retrieval system which includes an elongated storage medium which is in constant motion and contains a plurality of image frames adapted to be scanned by a plurality of scanning means positioned adjacent said storage medium with means provided for indicating the position of a predetermined length of said storage medium relative to said scanning means and including means for selectively switching the output of said plural scanning means to any of a plurality of monitor stations in said system so that an operator at a particular monitor station may select a particular length of said storage medium for scanning without the need for a long waiting period for said length to approach a scanning means in said system.

Still another object is to provide a new and improved information storage system for storing a multitude of image frames in a predetermined order therein, said system having a variable access time to any frame or frames therein with means whereby a person monitoring predetermined of said frames may minimize said access time.

Still another object is to provide an automatic information storage system including means for storing millions of frames of image information and for automatically selectively reproducing therefrom predetermined of said frames either as temporary or permanent images.

Another object is to provide an automatic information storage system which may be manually operated for the selective reproduction of predetermined of a plurality of information frames and may be easily adapted of operation for the automatic photographic reproduction means and the reproduction of selected frames in said system.

Another object is to provide automatic scanning apparatus including a scanning system having a plurality of video scanning cameras or the like mounted on a common frame for movement across conveying means for plural image columns of film strips which scanning apparatus may be utilized for the transmission of image signals over plural communication channels to produce still images on respective remote viewing screens or plural image frames in the form of a so-called motion picture, there being one motion picture on each of said columns any one of which may be selectively reproduced on one or more of said viewing screens.

The invention also consists in certain new and original features of construction and combinations of parts hereinafter set forth and claimed.

The nature of the invention, as to its objects and advantages, the mode of its operation and the manner of its organization, may better be understood by referring to the following description, taken in connection with the accompanying drawings forming a part thereof, in which.

Before referring specifically to the drawings, the following assumptions are made pertaining to the subject matter thereof. For the purpose of simplifying the drawings it is noted that block diagram notation has been generally utilized to refer to the various components and sub-systems of the invention such as relays, switches, servos, storage systems, and signal generators. Where not shown, it is assumed that these components or sub systems are provided with the necessary power supplies or sources of electrical energy for their operation on the correct sides of all switches and relays. When a tone responsive relay is provided, for example, it is assumed that said relay is either normally connected to a power supply for the operation of said relay or is operatively connectable thereto upon the completion of a circuit between a monitor or receiving station and a station associated with the image storage system. Where a tone generator is utilized to generate a tone signal of a predetermined characteristic which is used to energize a tone responsive relay at a location remote therefrom for effecting a predetermined control action, it is assumed that said generator and relay may be replaced by other remote control means such as a code signal generator and a coded relay responsive to a specific code transmitted thereto by said code generator when connection between the two has been made.

Figure 3:
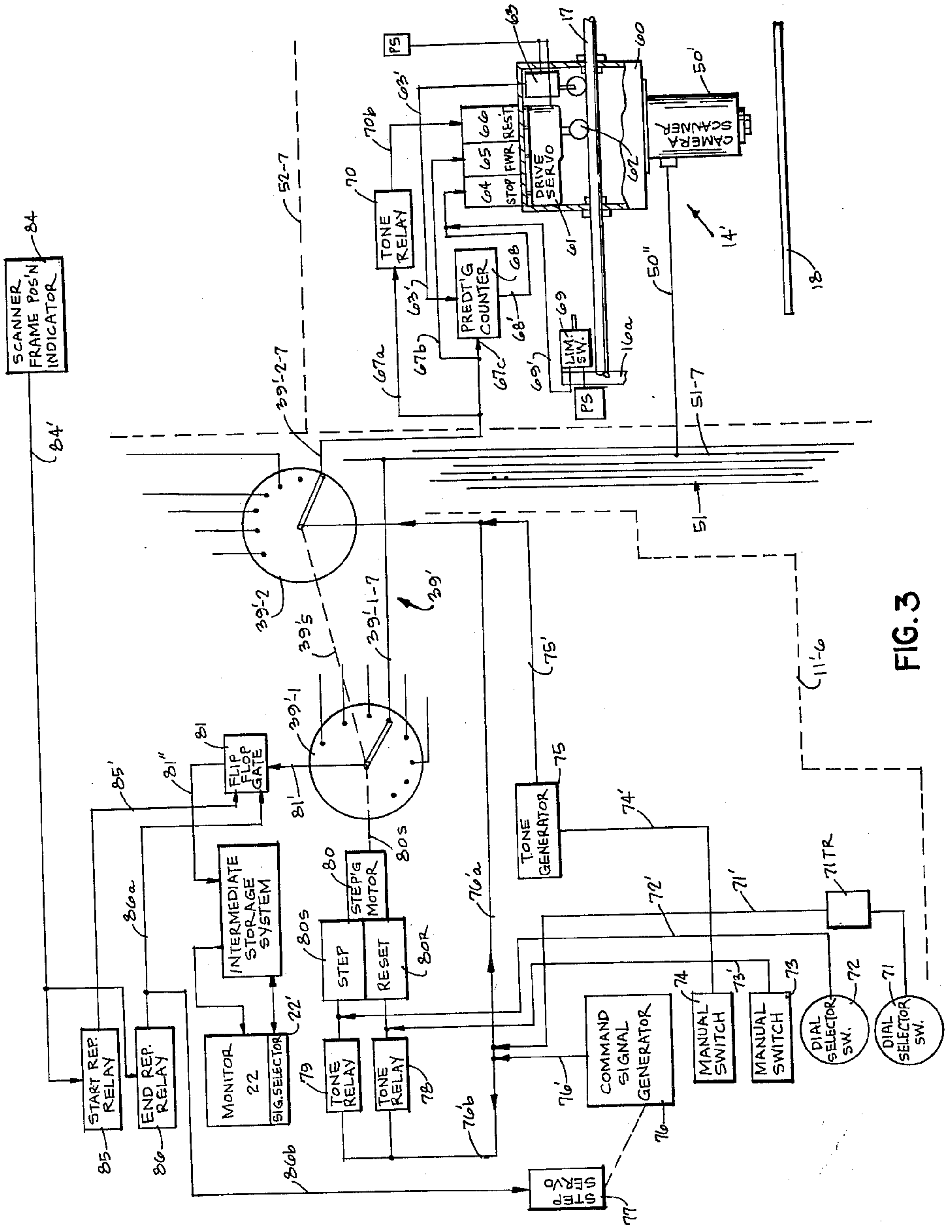
FIG. 3 is a schematic diagram showing further details of certain of the components of FIG. 2 and includes several modifications thereto.

Details of sub systems and components utilized in the apparatus of this invention may be found in my copending applications Serial Numbers 765,401 and 668,348. For example, the pulse presettable predetermining counter 68 of FIG. 3 is illustrated in detail in my copending application Serial Number 668,348 for Magnetic Recording Systems. The intermediate storage system 20' of FIG. 3 as well as the selection and control apparatus associated therewith may also be found in said copending application.

It is also noted that while the monitoring and scanning apparatus illustrated in the drawings is generally operative for the scanning and reproduction of one or more still images on a viewing screen remote from a storage conveyor containing said images, said apparatus is also utilizable for selectively producing one of a plurality of tandemly recorded motion pictures on said viewing screen. Plural strips or columns of image frames are provided on an elongated storage conveyor which is adapted for constant speed or intermittent movement past a video pick-up scanner which may be selectively positioned over one of said columns. Each of said columns may contain still images of single documents or arranged in a motion picture sequence of frames for the selective reproduction of different moving phenomenon and, as such, the apparatus may be utilized for closed circuit viewing of selected motion pictures. In accordance with my said copending application Serial Number 765,401 the image fields may each be scanned once while the conveyor therefor is either in motion or still and the resulting single frame picture signal may be transmitted over a connected channel for recording at a monitor station. It is also noted that the apparatus may be utilized for remote viewing of still pictures or documents recorded on a respective column or strip area of the conveyor whereby the conveyor moves slowly or is still while the camera scans at a conventional video rate and each frame is scanned a plurality of times.

While the communication channels provided between the monitor stations and selected cameras of the storage system are illustrated as conductors, they may also be short wave or micro-wave transmission means. The flexible image frame storage conveyor may be a belt, linked flights, intermittent feed of sheets or plates or a magnetic recording belt having image or other signals stored thereon for reproduction by selected, positionable transducers.

Referring now to the drawing, the automatic storage and retrieval system in accordance with my invention will first be described with reference to the specific embodiment depicted in FIG. 1, in which a block diagram representation of the basic elements of such a system is described in detail below with reference to FIGS. 2 through 8. In this embodiment a plurality of monitor stations 10-1, 10-2, 10-3, etc. are shown situated as an orderly array of booths or enclosures 11 provided adjacent each other for monitoring selected of a multitude of images provided in a storage system 16, although it is noted, that said individual monitor stations may be located at a plurality of different locations remote from each other provided that communication channels are provided between each monitor station and connectable to the storage system 16 by means of a switching system 13. The communications links may be wires or cables extending through the walls and floors of a building wherein the monitor stations comprise different rooms thereof, or information signal transmission may be established by short wave or power transmission carrier means. The switching and communication system may also comprise a conventional telephone switching system. Each of the monitor stations contains an image producing receiving means such as a video receiver referred to by the general notation 22 followed by a dash number equivalent to the dash number of the station and a manually operated control means 12 adapted, when controlled by the operator of the monitor station, to effect a particular connection between the receiver of the station and a particular information scanning means associated with 16 through the switching system 13.

The storage system 16 preferably comprises a movable mount 18 or conveyor for a plurality of image frames preferably provided thereon in a plurality of columns extending parallel to each other and the longitudinal directions of 18. Said mount 18 may comprise a flexible conveyor belt, or a plurality of individual conveyor flights or plates linked together in a closed loop or endless belt arrangement or otherwise and adapted to be driven in a predetermined path at a constant speed or intermittently past a plurality of transducers each of which is illustrated and referred to by the notation 14 followed by a respective dash number. The transducers 14 may each comprise a conventional video scanning camera provided on a mount or carriage which is adapted to travel along a respective track 17 positioned across the conveyor 18 by means of a support which may comprise a common frame 16′ for all of said tracks. The frame 16′ may consist of a box-like array of beams which are adapted to support not only laterally extending tracks 17 but also the means for guiding the conveyor 18. The notations 17–1 to 17–8 refer to the tracks or guides on which the respective scanning cameras 14–1 to 14–8 are movably mounted. The notations 15–1 to 15–8 refer to conducting cables which extend from the switching system 13 to respective of said cameras and contain means for transmitting picture signals, generated when said cameras are controlled to effect scanning of the conveyor 18, as well as conducting means for controlling servo motor means for positioning said scanning means along their respective tracks. The lines extending between 13 and each monitor station include a co-axial cable 19 or the like which is operatively connected between the picture signal input to the monitor receiver 22 and the picture signal output of any of the scanning cameras by means of said switching system 13, said picture signal output comprising one or more conductors which are part of the respective cables 15 of FIG. 1. The lines 12′ refer to the control conductors between the respective control panels 12 and the switching system 13.

Figure 1:
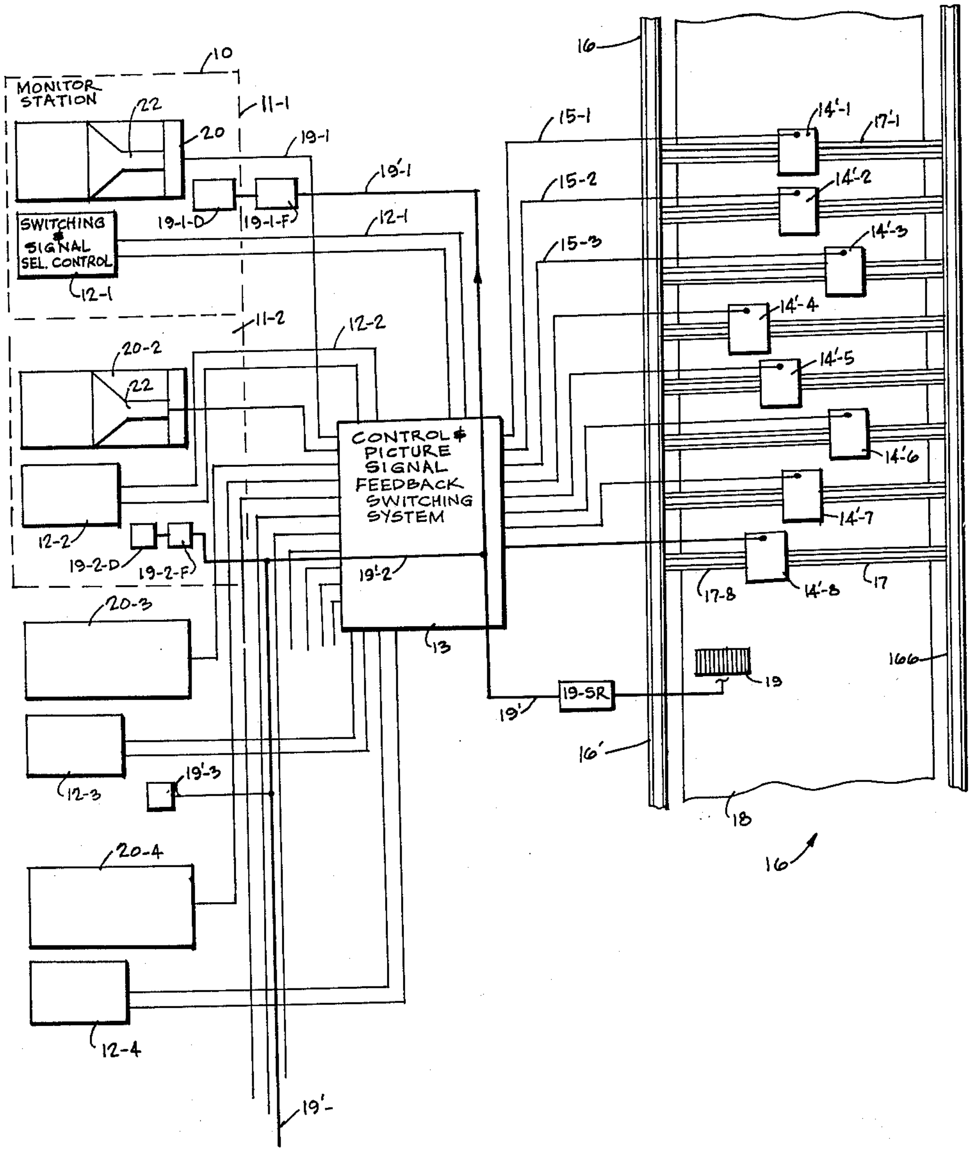
FIG. 1 is a schematic, block diagram showing some of the general components and sub systems of an information storage and retrieval system in accordance with the present invention.

Also illustrated in FIG. 1 are means for visually indicating the position of the conveyor 18 at any instant to the operator of each monitor station so that if a portion of the conveyor containing a predetermined frame or frames on which predetermined and desired information is provided, said operator may operatively connect the output and input circuits of his station with a scanner 14– which is positioned on a track or guide means 17– which is relatively close to that position of the belt containing the desired information. In this manner the operator need not wait a relatively long period of time while the length of the conveyor or belt which contains the desired information travels its course and approaches the camera. For example he may arbitrarily select a camera which is in a longitudinal position past which the selected information has just moved been conveyed which situation would require that the operator await the complete cycling of said conveyor before the selected frames or areas thereof can approach and pass his camera. In FIG. 1 the notation 19 refers to a bank of photomultiplier tubes positioned for reading code markings along one border of 18 which are indicative of the position of the conveyor at any instant. The parallel coded output of 19 is passed to a shift register 19SR and converted to series code. The output of 19SR may be connected to all of the video signal transmission lines referred to by the 19′– notations and utilized to effect a visual display on the face of the video receiver tube or may be filtered therefrom and used to energize a numerical display device. In FIG. 1 the output 19′ of the shift register is passed over separate circuits, 19′–1, 19′–2, etc. to respective numerical display means 19–1–D at respective stations each of which provides a visual indication to the operator of the position of the conveyor 18 at any instant. The display 19–1–D may comprise a bank of lights, or conventional numerical indicators or display tubes.

Figure 2:
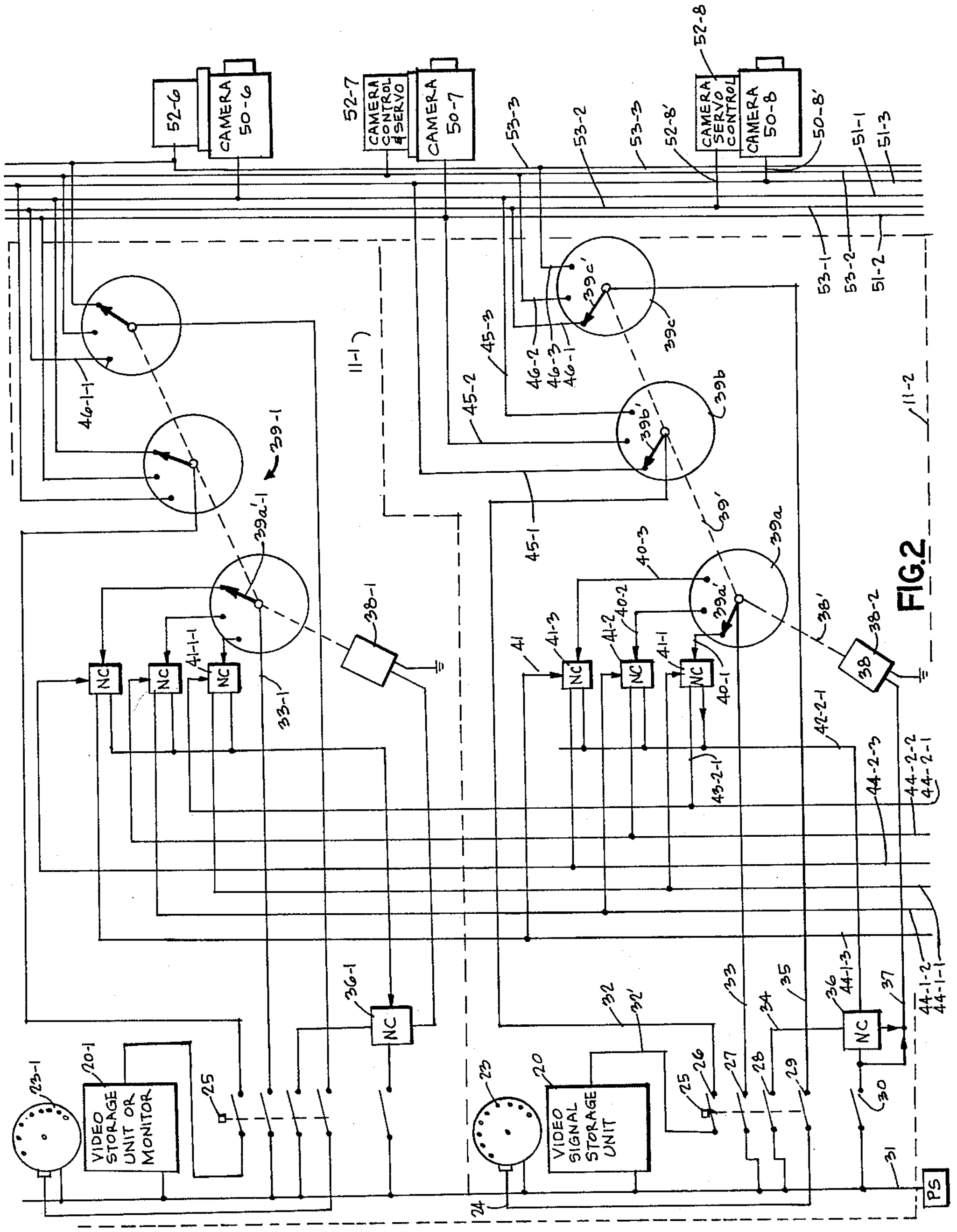
FIG. 2 is a block diagram showing further details of part of one form of the apparatus of FIG. 1.

FIG. 2 schematically illustrates further details of a switching and control system applicable to the apparatus of FIG. 1. The drawing illustrates the use of conventional rotary switches for effecting a connection between the output of a scanner or camera in the system which is not in use at the time the connection is made, and for further effecting a connection between a control means and a servo control for positioning of the connected camera. Other switching and connecting means may be employed such as conventional telephone automatic switching system or a system employing tone generators and tone responsive relays or code generators and coded relays at both ends of the system. A control system designed to perform the functions required for the operation of FIG. 1 must be capable of performing a number of distinct operations. Briefly noted, these include (*a*) the connection of the picture signal output of a camera not in use with the input to a video monitor receiver or to a video signal storage means 20 adapted to receive and magnetically or otherwise store one or a plurality of signals derived by scanning a selected frame or frames mounted on the conveyor 18, (*b*) connection between the output of a positioning controller located at the monitor station and a control or servo controlled thereby for positioning a selected scanning camera for scanning a predetermined of said image columns, and (*c*) automatic switching which prevents interference with the operation of the camera just selected by any other controller in the system.

In FIG. 2 three of the multiple cameras, 50–6, 50–7 and 50–8, are illustrated as are two of the monitor stations 11–1 and 11–2. It is assumed that the system consists of a larger number of said cameras or scanners and additional monitor stations. For the purpose of describing the operation of this system, the apparatus and switching means associated with monitor station 11–2 will be described below.

The primary switching function is effected by means of a three-deck rotary switch 39–2 the shaft 39′ of which is driven by a motor 38 the shaft 38′ of which is geared or coupled to 39′. The brushes or rotary arms **39*a*′, 39*b*′ and 39*c*′ of the respective decks, 39*a*, 39*b*, and 39*c* of the three tier rotary switch 39–2 are secured to the switch shaft 39′ and rotate therewith in unison. Each brush will thus touch a respective contact of its tier or deck when the brushes of the other two decks are closed on or touchin a respective contact of their respective decks. The deck 39*a* is used to perform two functions. One of these includes stopping the operation of the switch drive motor 38 so that the switch will effect a connection between the output of a camera not in use, and a picture signal input to the monitor station associated therewith. The other function of 39*a* is to effect the disassociation or lock-out of the circuits so connected that there can be no interference with the operation of said camera and its control by any other selector or controller in the system while it is connected to the monitor station 11–2. In FIG. 2 a connection is shown between the output 50–8′ of scanning camera 50–8 and the video signal storage unit 20 of 11–2 through the deck 39*b* of the rotary switch 39. The deck 39*c* is utilized to effect a connection between a positional control signal generator 23 and the servo control means 52–8 for the motor adapted to pre-position the camera 50–8 over a predetermined column of image frames on 18**.

The operation of the apparatus of FIG. 2 will best be described by describing what occurs during a selection cycle. Control of the camera positioning servo, which will be described hereafter, is effected by the transmission of a predetermined number of discreet signals or pulses from the monitor station to the servo controller associated with the camera, the output of which is connected to the monitor station. This group of signals or pulse train is utilized to set up or pre-set a predetermining controller such as a predetermining counter-relay in 52–8 which operates thereafter to pre-position the associated camera 50–8 in accordance with the number of pulses transmitted thereto. The pulse generating means may comprise an ordinary multi-position rotary dial switch 23 of the telephone type. To effect a connection with the camera not in use, the operator of the monitor station closes a four pole switch 25 having four switching pairs 26 to 29 which complete the following circuits. The first switch 26 completes a circuit between the output 32 of the switching deck **39*b* and the signal input 32′ to the video signal storage unit 20. The second switch 27 completes a circuit between a line 31 connected to a power supply PS and the input 33 to the deck 39*a* of switch 39–2. The third switch 28 completes a circuit between the power supply PS and an input to a normally closed switch 36 the function of which will be described. The fourth switch 29 completes a circuit between the output 24 of rotary switch 23, which is also connected to PS, and an input line 35 to the center pole or brush 39*c*′ of switch deck 39*c*. Upon the actuation of the switching arm of 25 and the closure of said switches, power from the power supply PS is fed through contacts 28 and normally closed switch 36 over line 37 to operate motor 38. Said motor 38 then drives the shaft 39′ of the multi-deck rotary switch 39–2 causing brushes 39*a*′, 39*b*′ and 39*c*′ to sweep past or step from one contact to the next of their respective switching decks. This action continues until a switching position has been reached for a camera not in use. The switching deck 39*a* has multiple outputs three of which, 40–1, 40–2, and 40–3 are illustrated. These outputs extend to respective inputs of normally closed switches, 41–1, 41–2, and 41–3. When any of the switches 41–1 are in their normal or closed condition, the power signal from PS generated on line 33 will pass through said switch and be generated on two output lines thereof. In FIG. 2, when power is generated on line 40–1, the input to switch 41–1, provided that said switch is closed, one of the outputs thereof, line 42–2–1, which extends to the switching input of normally closed switch 36 becomes energized. The energization of 42–2–1 causes 36 to open, thereby breaking the circuit between PS and the power input 37 to the motor 38. Said motor 38 is thereby stopped and stops the rotation of the switch shaft 39′ in a position to maintain 39*a*′ connected to the input 40–1, 39*b*′ in a position to connect the output 50–8′ of camera 50–8 and its connection 45–1 with the input circuit to 20 defined by lines 32′ and 32, the latter of which is connected to the input to the switching deck 39*b*. The third connection is established between the output 24 of dial switch 23, 35 and the input 52–8′ of the controller 52–8 thru switching arm 39*c*′ and lines 46–1 and 53–2. The camera output signal connection is effected respectively thru lines 50–8′, 51–3, 45–1, 39–*b*′, 32 and 32′ which may be co-axial cable or the like adapted for the transmission of conventional video picture signals or if camera 50–8** is a so-called slow-scan camera said lines may be ordinary voice wire pairs.

The other output 43–2–1 of switch 41–1, when energized, is utilized to effect said mentioned locking out action. Said line 43–2–1 is connected by means of a conductor 44–2–1 to the switching inputs of all normally closed switches which are in the same switching position of rotary switches, such as 39–2, of the connection control means of the other monitor stations which perform in the manner of that described for 11–2. Reference is now made to the monitor station 11–1. The normally closed switch 41–1–1 corresponds in function and position to 41–1 of station 11–2. When the power signal is provided on the output 43–2–1 of 41–1 it is utilized to open normally closed switch 41–1–1 as well as all other normally closed switches in a corresponding position or output line of all the first decks of all the rotary switches of the other monitor stations which correspond to 39 of 11–2. Thus when 41–1–1 is opened as a result of the line 44–2–1 being energized, the rotary switch 39–1 of station 11–1 will not stop in its rotation at the position defined by the output connected to 41–1–1, since switch 41–1–1 is open and the power signal generated on the input line 33–1 cannot pass therethru to open switch 36–1 and stop the motor 38–1. As a result, in the operation of 39–1 if the rotary switching arm **39*a*′–1 should be swept to the position to which 41–1–1 is connected, the switch arm will continue to rotate until it contacts an output which is connected to a corresponding normally closed switch which is closed. It is noted that at least one output of each of the bank of normally closed switches 41– is connected to the corresponding switching input to the normally closed switch 36–, so that regardless of which contact the switching arm 39*a*′ touches, if the switch associated therewith is closed, the motor 38 will stop and all other corresponding switches of the group referred to by the general notation 41– in the other monitor stations will be opened as the result of the signal passed to their switching inputs from the output of said 41– switch. After shaft 39′ has stopped and the switching connections established through 39–2 the operator of the monitor station may dial switch 23 to generate a predetermined number of pulses on line 24 and effect the pre-positioning of camera 50–8** as hereafter described.

For certain monitoring functions it may be desired to selectively connect a specific camera or a camera adjacent to it for connection to a specific monitor station. For example, in FIG. 2 the operator of the monitor station 11–2 may decide, if he knows the position of the conveyor 18 relative to 50–8, that said camera 50–8 is too great a longitudinal position away from a desired image frame. If said means is provided for indicating the position of 18 in the system and for indicating the position of shaft 39′ of rotary switch 39, for example by means of a rotary dial indicator coupled or connected thereto or merely by viewing one of the switch wiper arms such as **39*a*′, then the operator of station 11–2 may by-pass the position associated with switch 41–1 by closing a switch 30 which connects the power supply PS with line 37 and by-passes switch 36 so that the motor 38 continues to operate until 30 is opened whereafter it will stop when switch arm 39*a*′ touches a contact extending to a normally closed switch 41–** which is closed.

The notations 51–1, 51–2, 51–3, etc. refer to common lines extending thruout the system each of which connect a corresponding camera picture signal output line with a respective contact or input to each of the **39*c* banks of the rotary switches of each monitor station. The notations 53–1, 53–2, 53–3, etc. refer to common lines extending thruout the system each of which connect a corresponding output position of each of the central banks or decks 39*b* of each of the switches 39– of each monitor station with a respective input to a camera servo control means. For example, 53–1 connects the output 46–1 of deck 39*c* of switch 39–2 with the input 52–8′ of the servo control of 52–8 associated with camera 50–8. 53–1 also connects the corresponding outputs such as 46–1–1 of the other switching decks corresponding in function to 39*c* of the other monitor station rotary switches with the input 52–8′ of 52–8. The notations 44–1–1, 44–1–2, 44–1–3, etc. refer to lines extending thruout the system from respective normally closed switches in the banks 41–** of a specific monitor station which are adapted when energized to open all of the similarly positioned normally closed switches of all other stations to perform the heretofore mentioned function of locking out said positions so that the respective motors of said stations will continue to sweep the switch arms past said position.

In FIG. 3 is shown further details of the means for effecting the prepositioning of a carriage and scanning camera which is operatively connected to a monitor station at a lateral location such that the scanning axis of said camera is in alignment with a predetermined column of track of image frames of the conveyor 18. Details of the aforementioned circuit lock-out means are not shown in FIG. 3 and it is assumed that a visual means such as a panel board with a plurality of lights each of which pertains to a specific camera which lights up when said camera is in use, is provided to indicate to the operator of the monitor station which camera he may select for scanning without interfering with its use by someone else. This would eliminate the need for a lock-out system.

The system of FIG. 3 will be best described by describing a cycle of operation thereof. It is assumed that the operator knows in advance in which of the plurality of image frame columns of the conveyor 18 the document frame or train of frames he desires to optically scan is located. The operator effects a connection between an input line 39′–2–7 and a picture signal output line 39′–1–7 of a scanning apparatus 14′ which is one of a plurality of scanners of the storage system positioned over the conveyor 18. This connection is made by prepositioning the shaft 39′S of a two deck rotary switch 39′ so that the wiper arms of both decks are touching respective contacts which are connected to the lines 39′–2–7 and 39′–1–7. The former line connects a signal input from control apparatus at the monitor station 11′–6 to a predetermining controller at the scanning station 52–7. The latter line 39′–1–7 connects the picture signal output 50″ of camera 50′ to a signal input 81′ to a flip-flop gate or switch 81 the output 81″ of which is connected to an intermediate picture signal storage system 20′ from which said signal may be selectively passed to a monitor device 22 such as a video receiver at the will of the operator as described in my said co-pending patent applications by means of a selector and controller 22′.

Prepositioning of the shaft 39′S of the rotary switch 39′ may be effected by means of a stepping motor 80 the shaft 80S of which is coupled to 39′S. The stepping motor 80 is adapted to step in proportion to the number of pulses received on its stepping input 80S from a dial selector switch 72 which gates pulses thereto over line 72′ in accordance with the degree of rotation of the shaft of 80 desired to effect the predetermined prepositioning of 39′S from a zero position. The motor 80 is reset by energizing a reset input 80R by means of a manual switch 73 connected to 80R by line 73′. Once shaft 39′S and switch 39′ have been reset which should take no more than a fraction of a second, the operator then dials dial selector switch 71 which effects the transmission of a predetermined number of pulses over lines 71′, 76′a through switch deck 39′–2 to the input 39′–2–7 of the control apparatus of the connected scanner station 52–7. The pulses generated by switch 71 are utilized to reset a predetermining counter and relay 68 which serves as a means for controlling the drive motor 61 which drives the carriage 60 along lateral track 17 which is positioned over the conveyor 18. Line 39′–2–7 extends to the inputs of three devices. The first signal passed through the output of switch deck 39′–2 is passed by means of line 67b to the forward control 65 of servo motor 61 which it energizes causing said servo motor to drive the assembly 60 along track 17. A rotary limit switch 63 having its shaft operatively connected by means of a gear or wheel to one of the track members of 17 provides feedback pulses on line 63′ by gating a power supply PS to 63. Each of said feedback pulses is indication of the movement of 60 a predetermined distance along the track 17. For example, each pulse may be generated whenever 60 moves a lateral distance across 18 equivalent to the distance between center lines of each image column thereof. The feedback pulses are transmitted to an input of predetermining counter 68 and uncount said counter. The counter 68 has been preset by means of pulses generated by dial selector 71 and transmitted to the input 67c of 68. The operation of 68 has been described in my said copending applications. It will therefore suffice to say that when predetermining counter 68 has received on its input 63′ the same number of pulses which were transmitted to its presetting input 67c, it (68) will transmit a control signal on line 68′ which connects to the stop control input 64 of the servo motor 61 and which effects the stoppage of said motor with the scanning axis of camera 50′ in alignment with the selected image column of 18.

The notation 84 refers to a signal generator which is positioned to scan a surface of conveyor 18 containing coded markings which are indicative of the longitudinal position of the conveyor at any instant. The function of such a scanner has been described in my said copending application and it is used to provide a feedback signal or signals on a line 84′ to a start reproduction relay 85 which opens the flip-flop gate 81 at a predetermined instant whereby the picture signals generated by camera 50′ will pass therethru to input line 81″ to the intermediate storage system 20′ and will be recorded in 20′. The output 84′ of 84 is also connected to an end-reproduction relay 86 which becomes energized when a predetermined signal or signals appear from 84 and transmits a signal on an output 86a which opens gate 81 so that any signals generated thereafter by 50′ will not pass therethru. The operation of 85 and 86 may be predetermined by manual selection means or by automatic or semi-automatic means such as by means of punch cards or the like as described in my copending application.

When the operator of the monitor station has effected the transmission to his intermediate storage system 20′ of the signal or signals he desires, he may operate a manual switch 74 which energizes a tone generator 75 which transmits over the input 75′ in switching deck 39′–2 and to the input 39′–2–7 to the connected scanning station. The tone so generated is transmitted on line 67a to the input of a tone responsive relay 70 which provides an output signal on its output line 70b thereafter which energizes the reverse drive control 66 of motor 61 causing said motor to return the assembly 60 to the at-rest position along its track. Upon reaching said position the housing of 60 actuates a limit switch 69 which gates a pulse to the stop controller 64 for the servo motor 61 stopping said servo motor with the assembly 60 in its at-rest position. The operator then operates a manual switch 73 which energizes the reset input 80R of stepping motor 80 causing the shaft 80S and 39′S to return to a zero or reset position. The selection cycle thus ends. Depending on the design of the intermediate storage system, 20, the monitor viewer 22 may comprise either a conventional cathode ray tube image display means or an image storage tube adapted to retain any display written on its viewing screen when the write beam thereof is modulated by the video signal until erased therefrom. Reference is made to my copending applications Serial Numbers 765,401 and 515,417 in which plural video picture signals, derived from the single frame beam scanning of image fields, are stored on a magnetic tape or drum and are selectively reproduced to modulate the write beam of an image storage tube, for details of two designs for the intermediate storage system 20, monitor 22 and controls 22′ of this invention.

In the event that it is desired to effect the movement of the camera 50′ to a position over a predetermined column of image frames and the presetting of the start and end-reproduction relays 85 and 86, a command signal generator 76 may be provided having other than manual input means thereto. For example, the generator 76 may consist of a punched card reader which, when provided with one or more cards which are adapted to generate on the output 76′ thereof the desired command control signals, automatically reads said cards one at a time as described in my said copending application and effects the generation of said command signals. The command signal generator is adapted to not only provide the pulse signals on line 76′a which preset the predetermining counter 68 but also generate tone signals on 76′b for energizing tone responsive relays 78 and 79 which respectively energize the controls 80R and 80S. The notation 77 refers to a servo motor adapted for intermittently operating the command signal generator 76 which if 76 is a card reader, effects the intermittent movement of cards through the reading portion of 76 each time 77 becomes energized by the signal output of relay 86 which occurs at the end of a command cycle as described. The motor 77 may be operated by a timer associated therewith or a sequential controller which is initially energized by the signal developed on the output of the end-reproduction relay 86. The command signal generator, if a card reader, may be provided with automatic stacking and feeding means for a plurality of punched cards so that, if it is desired to automatically receive and store a plurality of different picture signals at the intermediate storage system 20, such function may be effected automatically after cards which are programmed for effecting the desired connections and servo-controlling functions as well as gating functions have been placed in the storage section of 76.

It is noted that the command signal generator 76 may also be a so called storage computer having a magnetic storage drum or tape portion thereof with the necessary pulse trains and tone signals provided thereon for effecting desired connection, control and gating functions as described. If said device 76 is a storage computer, the codes for the information contained on the conveyor 18 may be cross referenced and selected by means of signals recorded in the recording means of 76 in which, said signals are provided in the form of identification codes each of which indicates a specific sub-classification of information and the pulse train or trains associated therewith are provided for deriving one or more picture signals generated by scanning predetermined of the image frames provided on 18.

It is further noted that the apparatus of FIG. 3 may be utilized for the automatic generation of selected of a multitude of signals, derived by scanning, for performing functions other than monitoring.

Figure 4:
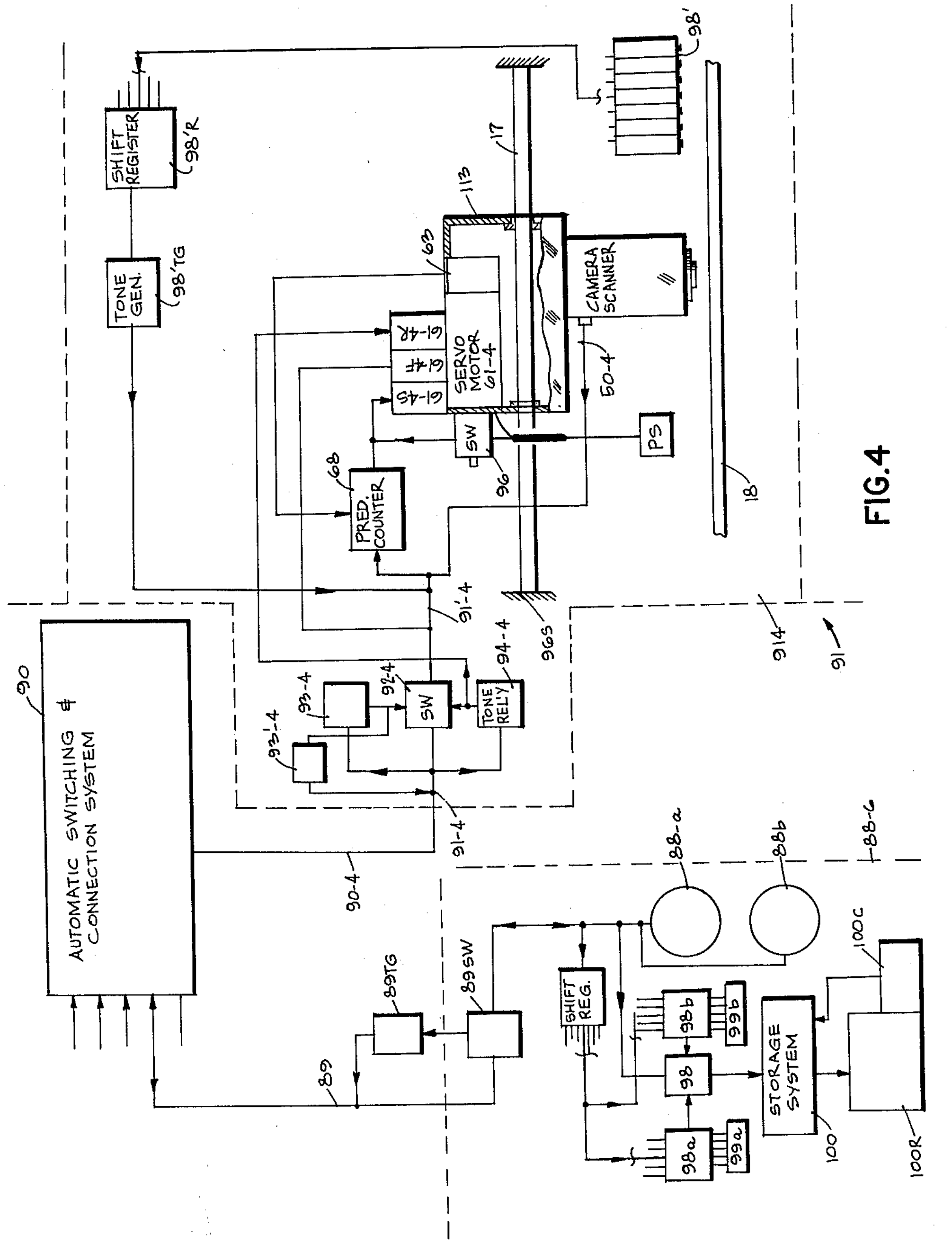
FIG. 4 is a schematic, block diagram of the general system illustrated in FIG. 1 utilizing an automatic switching and connection system such as a telephone communications system for connecting a monitor station with a selected scanner of the information storage system.

The block diagram, FIG. 4, shows a storage and retrieval system of the type described utilizing an automatic switching and connection system 90 of the conventional telephone type, for establishing communication links between said monitor stations and said plural scanning means. A system of this type will permit the monitor stations to be located at any point which is accessible to a conventional telephone communication system having terminal lines thereof extending to the plural scanning cameras of the storage system. A conventional telephone communication system may be employed if the cameras are adapted to scan at a so-called slow scanning rate. If the scanning means of the storage system are adapted to scan at a high frequency such that the resulting picture signal cannot be transmitted over conventional phone wire pairs, then the switching system may be modified with cables or the like as the communication wires between each monitor station, said switching system and said storage system or short wave transmission of the picture signals may be resorted to. Reference is made to my said copending application for details of means for scanning individual of the plurality of image frames on the conveyor 18 and gating selected of said signals to the connected monitor stations storage means.

In FIG. 4, an automatic telephone switching system 90 has a plurality of inputs thereto from a plurality of said monitor stations one of which 88–6 is illustrated. The output line 89 of 88–6 is a conventional voice wire pair and is adapted for two-way signal transmission between the monitor station and any of the scanning means of the storage system provided that the input to said storage scanning means is not already in use. In other words, the switching and connection system is provided with automatic lock-out means whereby once the connection is made between two terminal lines of the system no other connection can be made between said two lines until the circuit is broken.

A conventional dial rotary switch operated connection means is provided at the monitor station 88–6 for making the connection between the automatic switching system and a selected scanning means in the storage system 91. The various scanning means and their connection and control components are referred to by the general notation 90– and the station 91–4 is illustrated in detail for the purposes of describing the apparatus and its operation.

A connection is made between the switching system 90, monitor station 88–6 and the input 90–4 to 91–4 and a line 91′–4 extending to the control circuits and the output of the camera scanner 58–4 through a switch 92–4, as follows:

The automatic system 90 provides a ring signal of 91–4 when the correct number has been dialed by the dial selection switch 88*a* of monitor station 88–6. The switch 92–4 may be a bistable electro mechanical on-off switch actuated to close by means of a relay operated solenoid and to open by means of a second relay operated solenoid. The notation 93–4 refers to a solenoid and a relay for actuating said solenoid to close 92–4, said relay being responsive to the ring signal developed on line 90–4. The operation of 93—4 may also be utilized to energize a tone generator 93′–4 connected to line 90–4 for transmitting a tone signal back to the monitor station to indicate that the connection has been made or for other control purposes.

Once said connection has been made the operator of the monitor station may operate a second dial switch 88*b* which gates pulses from a power supply on the connected line for presetting the predetermining counter controller 63 and for energizing the state control 61–4F of servo motor 64–4 to start the camera carriage 113 in movement from its at-rest position along its track in order to preposition the camera over the predetermined column of image frames in accordance with the presetting of the predetermining controller by means of the operation of said second rotary switch. The notation 88CG refers to manually operative control means for effecting the gating of only signals derived from scanning predetermined image frames of the column over which the selected video scanner is prepositioned. The details of 88CG are illustrated in my said copending application.

After the operator at the monitor station has completed his monitoring functions he may break the connected circuit by opening switch 88SW which is in the output line 89 and requires closure in order to start the aforedescribed functions. The switch 89SW is operatively connected to a tone generator 89TG the signal output of which is connected to that side of line 89 which extends to the automatic switching system 90. The tone generator 88TG is adapted, upon the opening of switch 88SW, to generate a tone for a predetermined period on the connected lines which is transmitted to the station 91–4 and is used to energize a tone relay 94–4 having its input connected to the input line 91–4 and responsive to said tone signal. The tone relay is operatively connected to a solenoid which, when actuated thereby, effects the opening of switch 92–4 and is also connected to the reverse start control 61–4R of the servo motor 64–4 which drives the carriage associated with said station. When relay 94–4 becomes energized it provides a signal which thus starts said drive motor in reverse causing the carriage to move to one side of the conveyor to home-position. The home-position is determined by a limit switch 96 mounted on the carriage which is in a circuit with a power supply and the stop control 61–4S of motor 64 which is pulsed or energized when said limit switch is closed by the movement of the carriage to the end of its track when the arm of said limit switch engages a limit stop surface 96S which may be a part of or a projection from the frame or mount for said cameras. The cycle thus ends with the carriage at a home-position at which position it stays until it is controlled to move outward a predetermined degree therefrom over a predetermined position of the conveyor 18 by means of a control cycle as described.

In FIG. 4 the selective gating of a picture signal to the storage system 100 of the monitor station 88–6 is effected by means of code matching relays 98*a* and 98*b* in accordance with the teachings of my said copending patent application. A bank 98' of photomultiplier tubes or relays is positioned off the conveyor 18 near one border thereof and is adapted to read code marks thereon and to provide in a parallel code signal, indication of the position of the conveyor relative to the scanning camera. The parallel code is converted to a series code in a shift register 98'R in the resulting series code output thereof is transmitted to the monitor station 88–6 and through the gate 89SW and converted again to a parallel code by means of a second shift register 97. The multiple outputs of 97 are passed to the respective code matching relays 98*a* and 98*b*. When the code of the selected frame or the first of a plurality of frames selected to be scanned appears in the scanning fields of the bank of photomultiplier tubes, the code matching relay 98*a* which has been preset by means of a plurality of manual switches provided in bank 99*a*, becomes energized and closes a switch 98*c* gating the picture signal which is generated thereafter to the input of the storage system 100. When the code which is adjacent the row in which the last selected frame of the row of said frames is present, appears in the scanning field of the photomultiplier bank, the code matching relay 98*b* which has been preset by a bank of manual switches 99*b*, becomes energized and provides a signal for opening switch 98*c* so that any signals generated thereafter are not passed to the input to the storage means 100. The operator of the monitor station may thereafter, as described in my copending application, selectively reproduce the signals recording in 100 and monitor the resulting image field by the use of said reproduced signals to modulate the picture writing means of the monitor screen of the monitor receiver 100R by means of a control panel 100C which contains the necessary selection and switching controls for effecting the reproduction of said signals one at a time.

The dial switch 88*a* may be connected to the terminal circuit as described for gating pulses on the connected line or the connection to the automatic switching system 90 in the manner of a conventional telephone selection dial switch. The single dial selector 88*a* may also be used for presetting the predetermining counter 68 if the input thereof is provided with relay means which is responsive to the pulses generated on the connected line by the operation of 88*a*. Otherwise, the dial switch 88*b* may extend from or include a tone generator which is operative to generate specific tone signals on the completed circuit whenever 88*b* is operated to which signals a relay at the input of 68 is responsive whereby said counter is preset when 88*b* is operated.

Figure 5:
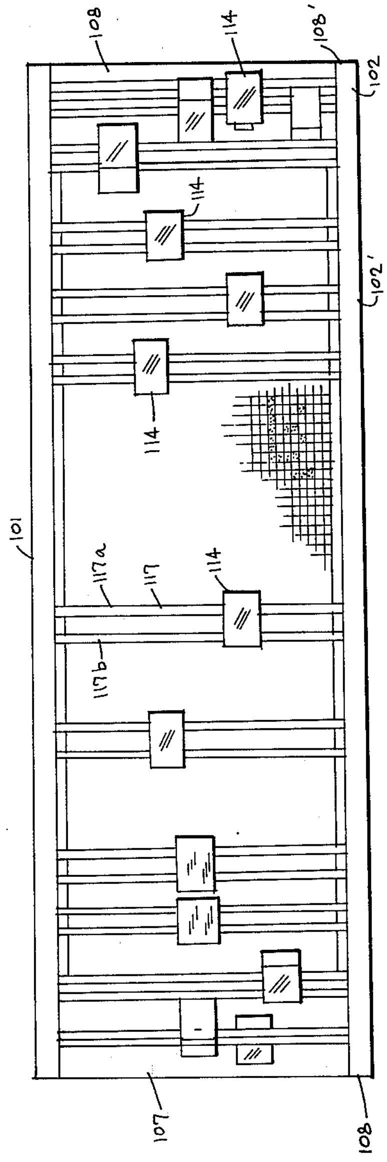
FIG. 5 is a plan view of image frame storage apparatus applicable to the systems of FIGS. 1 to 4.
Figure 6:
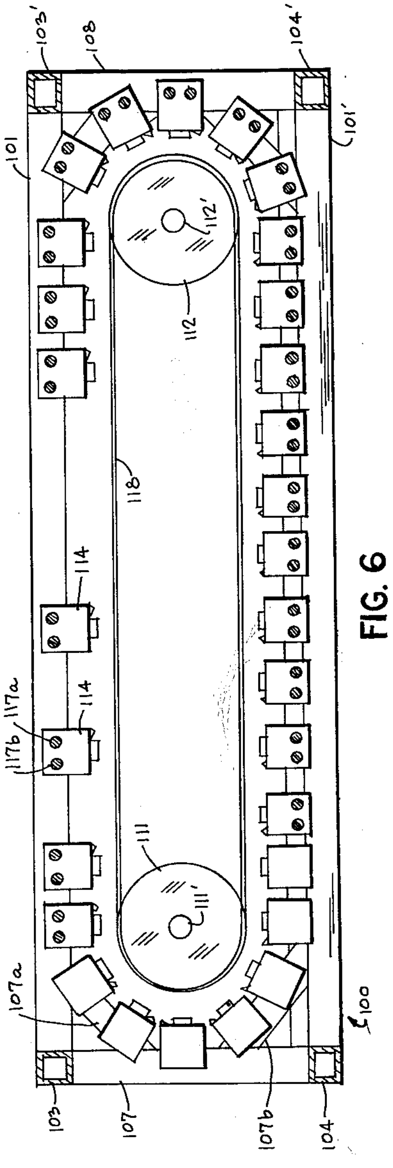
FIG. 6 is a side view of FIG. 5 with parts broken away for clarity.

In FIGS. 5 and 6 are illustrated details of the physical arrangement of components of one type of image frame storage system of this invention. The arrays or columns of image frames are provided mounted on an elongated, closed-loop flexible conveyor or belt 118 which is preferably a plurality of flights linked together and designed in accordance with my said copending application. The conveyor 118 is driven in a closed loop path around two sprockets or drums 111 and 112. The shafts of the drums, 111' and 112', are supported by bearing means, not shown, which are supported off the floor by members extending from a box-like structure or frame 100 which is also used to support the plurality of tracks for the scanning cameras. In FIGS. 5 and 6 the frame consists of four longitudinal box beams 101, 102, 101' and 102', which are joined at their ends by lateral beams 103, 104, 103' and 104'. The prime notations refer to the lower beams of the frame 100 which are preferably secured to a floor to prevent movement of the frame.

Extending across the frame between the upper and lower paths of longitudinal beams and supported thereby are a plurality of tracks 117 which comprise in FIGS. 5 and 6 pairs of rods or tubes 117*a* and 117*b* which pass through the walls of the carriage or housing for the camera associated therewith and support said housing in sliding bearing so that it may be movable along said members. In order to provide a maximum number of said tracks 117, they may extend not only between the upper longitudinal beams 101 and 102, but also between the end vertical beams 107, 107' and 108, 108', which complete the box-like frame. Gussets or beam fill-ins provided at the corners of the rectangular frame portions defined by the longitudinal and vertical members may be used to support tracks positioned to support cameras scanning those areas of the conveyor 118 which just enter and leave the respective drums. Said gusset supports are referred to by the notations in FIG. 5 as 107*a*, 107*b*, 108*a* and 108*b*. It is thus noted that certain of the cameras 114 are provided with their scanning axis and adapted to scan vertically downward, others upward, others horizontally and others oblique to the horizontal. It is further noted that the single elongated closed loop formation of the conveyor of FIGS. 5 and 6 may be modified to include a plurality of inverse loop portions of a singular closed loop belt, said portions running parallel to each other and in opposite directions by means of plural roller guides or drums with plural cameras extending between loops certain of which cameras may be adapted to scan one face of the conveyor while others are mounted in position to scan the other face of the conveyor. It is thus possible to derive a maximum storage density in a minimum volume.

It is noted that the single belt 118 may be replaced by, in addition to a flight or plate conveyor, a plurality of narrower belts or flight conveyors. Each of these narrower conveyors may be driven by a common drive means on single drums or sprockets or on respective separate drums or sprockets. If separate drums or sprocket systems are utilized for each narrower conveyor, and are each driven by a respective drive motor, the speed and direction of each motor may be remotely controllable by, for example an operator at respective of said monitor stations. By selectively connecting a motor speed and direction control with control means such as described, at a respective monitor station, the operator may speed up the movement of a particular column or filmstrip so as to derive the positioning of a selected frame or frames in the scanning field of his camera in less time.

A further variation in the apparatus described above includes the provision of a different motion picture phenomenon on each of said selectively controllable filmstrips whereby one or more screen viewers may view a selected motion picture produced by a respective camera.

Figures 7, 8:
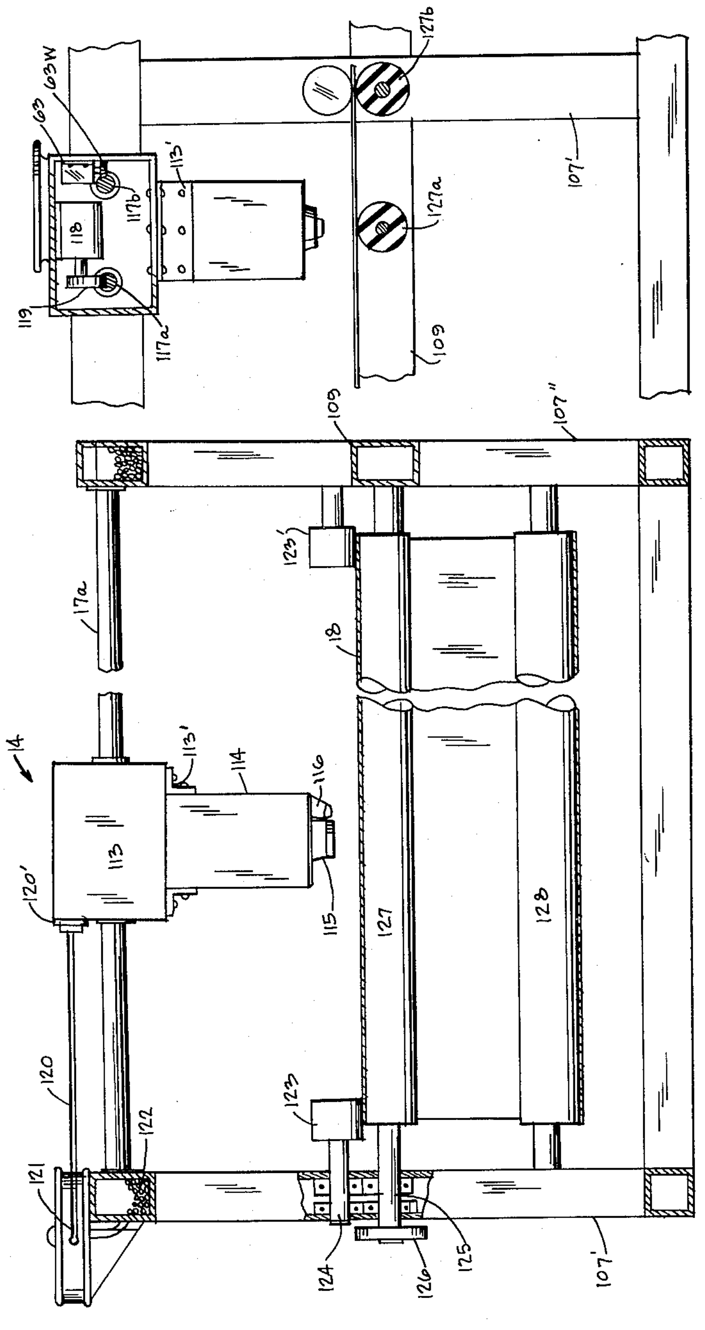
FIG. 7 is an end view of FIG. 5 with parts broken away for clarity.
FIG. 8 is a partially sectioned side view of FIG. 7 showing further details of the apparatus of FIG. 7.

FIG. 7 shows further details of the scanning apparatus and its mount. The scanning unit 14 consists of an upper assembly or carriage 113 of rectangular shape having a conventional video scanner or camera 114 which is secured to 113 and extends downward therefrom as illustrated. Angle brackets 113' are secured to the side walls of 114 and fastened to the bottom wall of the housing 113. FIG. 8 illustrates details of the interior of the carriage in side view. The cylindrical track members 117*a* and 117*b* are shown passing through respective slide bearings 117*c* secured to respective side walls of housing 113. The housing or carriage 113 is thus free to slide along the members 117*a* and 117*b* laterally across the entire conveyor so as to be positionable over or adjacent any defined column of said image frames. Mounted within the housing 113 are shown a servo motor and its controls 118 which is secured to a top wall of the housing. The shaft of the motor in 118 has a spur gear 119 mounted thereon which is positioned in engagement with a spur gear rack which is mounted on or machined in the rod shaped track member 117*a* so that as the motor rotates the rack and pinion arrangement of gears will effect the driving of the assembly 14 along the track.

Also shown in FIG. 8 is a small wheel-driven counter 63, the function of which has been described, which is mounted on the inside side wall of the housing 113 and has its wheel 63*w* adapted to engage a surface of the track member 117*b*. Said wheel 63*w* may be a small pinion gear adapted to engage a rack gear cut in or provided on 117*b*, or it may merely frictionally engage the surface of 117*b*. The unit 63 is preferably a rotary limit switch adapted in a circuit with a power supply to provide a feed back pulse with each revolution or fraction of a revolution of its shaft mounted wheel 63*w*, said feed back pulses are utilized for effecting positional control of the assembly and especially the scanning axis of camera 114 relative to a predetermined or selected document column of the conveyor 18.

Since it is necessary to transmit electrical energy to the servo, switch, and camera and to do so regardless of the degree of movement or the assembly 14 across the conveyor 18, a rotary reel type of electrical extension cable 121 is mounted on the top of one side of the box frame 100 in line with the track 117 with the cable 120 thereof, which contains the plural conducting wires, being secured at the free end by means of a plug or connector 120′ to the housing 113 and adapted to be pulled thereby 114 moves away from 121. When the assembly 14 moves towards 121, said reel is under spring tension and is adapted to pull the free end of the line 120 in a manner to wind it up on the spool so that 120 is always kept taut. Thus each of the assemblies 114 of the system is provided with its respective spool type of self winding reel such as 121 which has multiple conductors extending therefrom which are connected to the conductors in 120, to respective further conducting means such as illustrated in FIGS. 1 to 3. The notation 122 refers to the plurality of conductors or wires which are supported inside the longitudinal beam 101 and extend therealong to the various camera assemblies by means of respective reels such as 121 and flexible conductors such as 120. The wires comprising 120 include a power supply for the camera and the controls for the servo motors, and a coaxial cable or the like for transmitting the picture signal generated by the scanning function of 114 to the switching system and thence to the inputs to any monitor station connected thereto. The self reeling extension means 121 may be replaced by an expandable coiled cable.

Details of the conveyor and the guide means therefor are illustrated in FIGS. 7 and 8. The conveyor guide means, two of which 127 and 128 are illustrated, comprise a plurality of rollers one or more of which are power driven by means of a motor, not shown, on which the conveyor is driven. The rollers also serve to accurately preposition the conveyor so that the image bearing media mounted thereon will be in a predetermined plane relative to the scanning cameras. If the conveyor comprises a plurality of linked flights certain of the guide means may comprise rollers such as illustrated whereas others will comprise sprocket wheels adapted to engage said flights or chains coupled to said flights for driving said conveyor. The broken away portion of FIG. 7 shows the shaft 125 of the roller 127 supported by a bearing 125*b* which is mounted on a vertical 107′ extending between the upper and lower longitudinal members which comprise the frame 100. A gear 126 on the end of shaft 125 may be driven by a chain extending from a motor drive means adapted to drive all of the plurality of upper and/or lower rollers such as 127*a* and 127*b* of FIG. 8. It is noted that in FIG. 8 that the roller 127*a* is positioned in direct alignment with the scanning axis of the camera 114. Thus, even if 18 sags between rollers its surface which is in the scanning field of the particular camera will always be positioned a predetermined distance therefrom so that the camera can be focused which focus it will maintain at all times. The notations 123 and 123′ refer to free wheeling rollers mounted on respective shafts such as 124 which are supported in bearing by the respective vertical member such as 107′ which supports shaft 125 or by a horizontally extending member such as 109 which is supported by 107′ and/or the end verticals 107 and 108. Further details of the construction of such a frame end conveyor are illustrated in my said copending application. The notation 116 refers to a lamp for lighting the scanning area of the camera.

Figure 10:
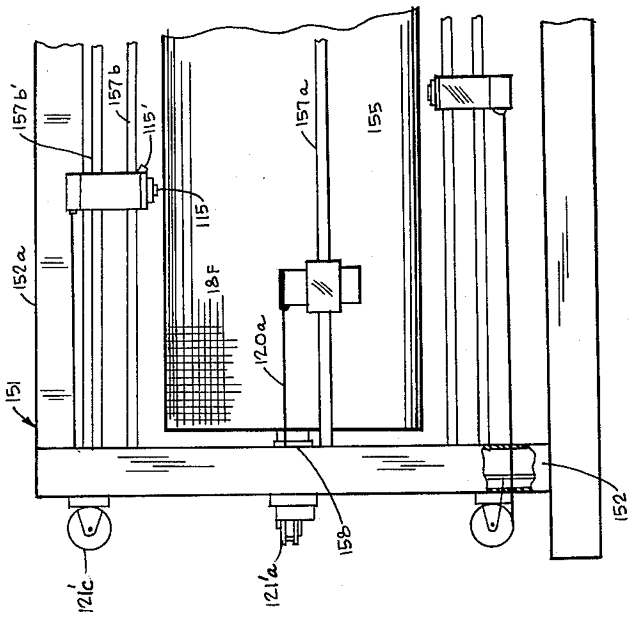
FIG. 10 is a partial end view of FIG. 9.
Figure 9:
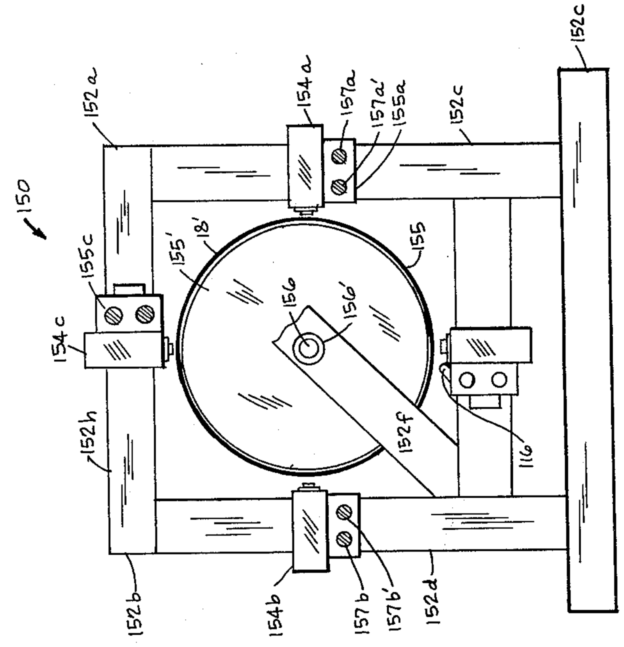
FIG. 9 is a side view with parts broken away for clarity showing a modified form of image frame conveying apparatus utilizing a storage drum.

FIGS. 9 and 10 illustrate details of a plural image frame conveying means which is a rotatable drum 155 mounted on a shaft 156 which extends therethrough and is supported by end plates 155′ which close off the end of said drum. The shaft is supported in bearing by an extension 152*f* of a box-like frame 150 made of a plurality of structural beams which include upper horizontal members 152*a* and 152*b* which are joined at their ends to vertical support beams two of which, 152*c* and 152*d*, are illustrated in FIGS. 9 and 10. The frame is completed by means of horizontal end beams one of which 152*h* is shown and a rigid base 152*e* to which the vertical legs are secured. A plurality of image frames are mounted in columnar arrays on the surface of the drum 155′ which is power operated by means of a motor (not shown) to rotate at substantially a constant speed or to step in an intermittent manner past a plurality of cameras such that each frame 18F thereof after it enters the field of a camera will come to rest and be centered therein for scanning.

Four cameras or scanners are illustrated in FIGS. 9 and 10 mounted on respective tracks in a manner such that they may be moved parallel to the axis of the drum and positioned over any columnar formation of said frames 18F. The mounting of these cameras is quite similar to that illustrated in FIGS. 7 and 8. The mounting and guiding means for the cameras 154*a* to 154*d* will be described by referring to the scanning apparatus associated with 154*a*. The housing of the camera 154*a* is removably secured to a carriage 155*a* which is constructed as described with bearing means for supporting said carriage on a pair of cylindrical tubes or rods 157*a* and 157*a′* which are supported at their ends between verticals of the box frame. Carriage drive means such as illustrated in FIG. 8 are provided for the propulsion of said carriage and camera along the track. A self winding reel or spool 121′*a* is mounted at one end of the track on the frame and is adapted to maintain a flexible cable 120*a* extending to the camera in a state of tension regardless of the position of the camera and carriage along its track. Thus, power to and signals from the camera may be conducted from a source exterior of the apparatus and to a monitor station through wires extending from the commutating reel 121′*a*. The notation 152*f* in FIG. 9 refers to a diagonal beam supported by the verticals 152*c* and 152*d* which supports the bearing 156′ supporting shaft 156 of drum 155.

As in FIGS. 7 to 10, the notation 115 refers to the lens system for the cameras and 116 refers to a light source mounted on the end of the camera housing adapted to light up the scanning field of said camera which is essentially the area covered by one of the image frames 18F.

Although the drum conveying means of FIGS. 9 and 10 does not have the storage capacity of a conveyor such as 18 of FIGS. 7 and 8, it is noted that a large storage capacity may be derived by providing a drum with a large diameter and that further scanning means may be provided such as video cameras which are spaced closer together than illustrated in FIGS. 9 and 10.

The selection and connection means as well as the gating means of FIGS. 1 to 3 are applicable to the storage apparatus illustrated in FIGS. 5 to 10. It is noted that said apparatus is subject to a certain degree of variation in the designs illustrated and that by utilizing a plurality of the conveyors of FIGS. 5 to 8 and/or FIGS. 9 and 10 wired or otherwise operatively connected to an automatic switching system such as a telephone dial system, many millions of frames may be stored and the images thereof derived remotely without the necessity of removing said frames from said storage. If an automatic means is provided for indicating the position of the conveyor 18 of FIGS. 5 to 8, at any time or the angular position of drum 155 at any instant, and said indication is available to the operator of each monitor station, then by the means heretofore provided he may select any camera in the system, if it is not already in use, for reproducing frames on a specified column thereof. He may select, for example, a camera which is closer to a specific frame or group of frames than other cameras in said system and thereby reduce the time required for access to the pictorial content of said frame or frames. If the belt or drum is divided into a plurality of sections or rows of said frames each of which is identified by a numerical notation, and the operator of the monitor station knows in advance that information he seeks may be obtained in a specific column or row or tandem array of said rows, if he knows the position of the conveyor relative to a starting or predetermined point in said system, then said observor may, by the means heretofore described, selectively connect the output of a camera which is located at a longitudinal or angular position relative to the conveyor such that the row or rows in which the desired frame or frames are situated will shortly thereafter pass the scanning position of the camera provided that it is prepositioned over the correct column. Knowing in advance the time it takes to preposition any camera over the desired column, the operator may make a decision as to which camera he desires to connect with his monitor station and by the switching means described may effect said connection so that access time will be reduced to a very minimum.

I claim:

1. In an automatic communication and monitoring system the combination of:

(*a*) a plurality of video scanners provided at different locations in said system, (*b*) a guide means for each of said scanners, (*c*) each of said scanners being movable on its guide means to change the spatial position of its scanning field, (*d*) servo motor means for moving each of said scanners, (*e*) a monitor station having means for recording signals and viewing means for transducing video signals into images, (*f*) a plurality of communication channels for selectively connecting the picture signal output of a selected scanner with an input to said monitor station, (*g*) switching means for connecting a selected scanner with an input to said monitor station, (*h*) a control means operative from said monitor station for controlling the movement of a scanner having its output connected to the input of said monitor station, (*i*) an informtion storage means having a plurality of different information storage areas extending in an array of plural columns, said information storage means being movable relative to said plurality of scanners, (*j*) the path of movement of each of said scanners extending across a plurality of said columns of storage areas, (*k*) means for starting the servo-motor means of a scanner after the connection has been made with said monitor station and for operating said control means in a manner to effect the movement of said scanner in a predetermined path whereby its scanning field is changed in a predetermined manner, (*l*) and means thereafter for gating picture signals generated by said connected scanner to the input of said monitor station.

2. A searching system for automatically monitoring selected of a plurality of document recordings comprising in combination with a monitor station having an image viewing means, a video-signal input to said monitor station, an information storage system comprising a conveyor for a plurality of document recordings arranged in a plurality of tandem arrays of parallel record tracks, power means for moving said conveyor, a plurality of video scanners adapted for scanning said document recordings and for generating video picture signals, a guide means for guiding each of said scanners in movement across said conveyor parallel to said record tracks, a servo means operatively connected to each scanner for moving it in the path defined by its guide means, a control for said servo means, a plurality of controls at said monitor station including a first remote control means, a first switching means operatively connected to each scanner and said monitor station for coupling the output of a selected scanner with said video signal input, a second switching means for connecting said first control means with the control for the servo means of the selected scanner, said first control means being operative to control the servo of the scanner coupled to said monitor station to position said scanner in alignment with a selected record track, a second control means at said monitor station including means for gating a selected picture signal, generated when the scanner connected thereto scans a predetermined recording, to said image viewing means and means for transducing said signal to a visual image in said viewing means.

3. A system in accordance with claim 2, said document recordings being arranged in substantially parallel lateral and longitudinal arrays on said conveyor, said guide means for said scanners adapted for guiding each of said scanners in paths parallel to each other with the longitudinal positions of said scanners being such that each may simultaneously start scanning a document recording regardless of which record track it is aligned with.

4. A system in accordance with claim 3 in which said scanners comprise a plurality of television cameras each having a read beam with horizontal and vertical deflection means for scanning an image field, said conveyor for said document recordings being operated by an intermittent drive adapted to move the conveyor in a manner to center each frame passing a camera in the scanning field of said camera and to retain the frame therein for sufficient time to permit the read beam of the camera to effect at least one complete sweep of the frame and to automatically operate the conveyor thereafter to move the frame out of the scanning field for positioning the next frame therein.

5. A system in accordance with claim 2 in which said scanners each comprise a beam scanning means with an automatic sweep control adapted to cause the beam to continuously operate and to effect a line sweep of a narrow band of the image of each document recording passing said scanner, said means for moving said conveyor comprising a constant speed drive for moving the recording at a speed to produce a video picture signal on the output of said scanner, said monitor station means for gating a selected picture signal thereto comprising positional recordings registered on said conveying means with each lateral row of said document recordings, a recording selector, means at said monitor station for presetting said selector, transducing means for said positional recordings operatively connected to said recording selector to transmit feedback signals thereto derived from scanning said positional recordings, said recording selector being operative to gate the signal derived from the sweep of the beam of said scanner in scanning a single document recording as it moves past said scanner.

6. A searching system in accordance with claim 3 in which said conveyor for said recordings comprises a storage drum operative to rotate about its longitudinal axis and said document recordings are provided on the exterior surface of said drum.

7. A system in accordance with claim 6 in which said drum is rotationally supported on a rigid frame which also supports the guide means for said plurality of video scanners, said guide means being positioned on said frame for guiding said scanners in paths parallel to the axis of said drum.

8. A searching system for automatically monitoring selected of a plurality of document recordings comprising in combination with a monitor station having an image viewing means, a video signal input to said monitor station, an information storage system comprising in combination with a cylindrical storage drum supported for rotation about its longitudinal axis, a power means for rotating said drum at constant speed, said recordings being arranged in substantially parallel lateral and longitudinal arrays on said conveyor defining a plurality of circular record tracks, a plurality of pick-up transducer scanners adapted for scanning said document recordings and for generating video picture signals, a guide means for guiding each of said scanners in separate paths parallel to the longitudinal axis of the drum and to the surface of the drum, a servo means operatively connected to each scanner for moving it along its guide means, a control for each servo means, a plurality of controls at said monitor station including a first remote control means, a first switching means operatively connected to each scanner and said monitor station for coupling the output of a selected scanner with said video signal input, a second switching means for connecting said first control means with the control for the servo means of the selected scanner, said first control means being operative to control the servo of the scanner coupled to said monitor station to position said scanner in alignment with a selected record track, a second control means at said monitor station including means for gating a selected picture signal generated when the scanner connected thereto scans a predetermined recording as it passes said scanner and transmitting said recording to said video signal input, and control means at said monitor station for using said selected picture signal to generate a visible image on said image viewing means.

9. An information storage and reproduction system for automatically monitoring selected of a plurality of document recordings comprising in combination with a monitor station having an image viewing means, a video signal input to said monitor station, a storage system for said document recordings comprising in combination with a storage drum adapted for rotation about its longitudinal axis, power means for rotating said drum, at constant speed, said recordings arranged in substantially parallel lateral and longitudinal arrays on the surface of said drum and defining a plurality of circular record tracks, a plurality of pick-up transducer scanners adapted for scanning said recordings and for generating video signals for modulating and producing different images on said image viewing means, a guide means for guiding each of said scanners in separate paths parallel to the longitudinal axis of the drum and parallel to the drum surface, a servo means operatively connected to each scanner for movement along its guide means, means for controlling said servo means for prepositioning the scanner, a first control at said monitor station operatively connectable to the control means of each servo, a first switching means operatively connected to each scanner and said monitor station for coupling the output of a selected scanner with said video signal input, a second switching means operatively connected to said first control and the controls of all servos for coupling the control at the monitor station with the servo of a scanner connected thereto, said first control being selectively operative to position the connected scanner in alignment with a predetermined record track, a second control means at said monitor station including means for gating a signal generated when the scanner connected thereto scans a predetermined recording as it passes said scanner, means for transmitting said recording to said video signal input, means for storing a purality of video signals at each monitor station and control means at said monitor station for selectively reproducing signals from said storing means to generate a visible image on said image viewing means.

10. A searching system for automatically monitoring selected of a plurality of document recordings comprising in combination with a plurality of monitor stations each having a video signal input operatively connected to an image monitor means, a storage system comprising a conveyor for a plurality of image frame recordings situated remote from said monitor stations, said frame recordings being arranged on said conveyor in a plurality of tandem columnar arrays defining parallel record tracks, with individual lateral frames of each track arranged in parallel rows across said conveyor, means for powering and driving said conveyor for longitudinally moving said recordings, a plurality of television scanning cameras, means for guiding each of said cameras in movement laterally across said plural record tracks, in parallel paths which are spaced apart whereby when any frame is longitudinally centered in the scanning field of one camera the other cameras will have respective frames longitudinally centered in their scanning fields, a servo means operatively connected to each camera for moving it in the path defined by its guide means, a first control means at each monitor station for positioning a selected camera in alignment with a predetermined track for scanning the individual frames thereof, a plurality of switching means, a means at each monitor station for operating said switching means to couple the output of a selected camera with the monitor station's signal input and for connecting said first control means thereof with the servo control of a selected camera, a frame selection means at each monitor station for gating selected picture signals, which are generated when a camera scans predetermined image frames, to said monitor station, said selection means comprising in combination with a normally open switch in the circuit which includes said monitor input and the camera connected thereto, relay means for closing said normally open switch comprising a code matching relay having a plurality of selection circuits which are presettable in a code array, from the monitor station and a plurality of feedback inputs, means for generating on said feedback inputs a different feedback code with each incremental movement of said conveyor in which a frame enters a camera scanning field, means for transmitting said code to said feedback inputs, said relay being operative to close said normally open switch each time a code present on the selection circuits thereof is matched by a feedback code whereby a predetermined picture signal is passed to said video input.

11. A searching system in accordance with claim 10 in which said means for generating said feedback codes comprises a code track portion of said conveyor containing visual code marks extending parallel to said record tracks, and a plurality of photoelectric scanners positioned over said code track for reading said code marks, said code marks being arranged in a parallel progressing code which changes with each frame length of said conveyor, the outputs of said photoelectric scanners being operatively connectable through said feedback inputs to said code matching relay.

12. A searching system for automatically locating selected of a plurality of document recordings comprising in combination with a plurality of monitor stations, a video signal input to each of said monitor stations, a storage system for a plurality of document recordings including an endless track conveyor, said recordings each being of substantially equal area and arranged in close proximity as a plurality of parallel tandem aligned frames which frames also extend as substantially parallel rows across said conveyor, at least one video scanner, a guide means for guiding said scanner across said conveyor parallel to said rows of image frames, a first servomotor for driving said scanner, a selective control means for positioning said scanner in alignment with a selected frame column, means for generating a plurality of signals for indicating incremental movement of said conveyor, a presettable frame selector means at at least one of said stations responsive to said signals and operative when a preset condition is attained to gate a video signal generated by said scanner in scanning a predetermined portion of said conveyor to said input of said one of said monitor stations, storage means at each of said monitor stations for recording a plurality of said video signals, including a recording member, a transducer operatively connected to said video signal input and adapted to record signals as they are received onto predetermined areas of said recording member, and means for controlling said storage means for the selective monitoring of said recorded signals whereby the selected document recording is recorded in a particular monitor station recording member to be monitored while said scanner is released to serve other monitor stations.

13. A searching system for automatically locating selected ones of a plurality of image field recordings comprising in combination with a plurality of monitor stations each having an image viewing means, a video signal input to each of said monitor stations, an information storage system comprising a conveyor for a plurality of document recordings arranged in tandem arrays on a plurality of parallel record tracks of said conveyor, first servomotor means for driving said conveyor, a video scanner, a guide means for guiding said scanner in movement laterally across said parallel record tracks, a second servomotor means operatively connected to said scanner for moving it in a path defined by said guide means, means for remotely operating said second servo motor from a monitor station to position said scanner in alignment with a selected record track, a monitor selective signal storage means operatively connected to said video signal input of each monitor station, said monitor storage means including a first transducing means for recording video signals and a second transducing means for selectively reproducing recorded signals from said monitor storage means, a switching means for gating picture video signals generated by said scanner to said monitor storage means, said switching means being operative to pass those video signals from selected document recordings to the monitor stations so selecting them, means at each monitor station for selectively operating said switching means, means for recording said video signals in each monitor storage means, and means at each monitor station for operating said transducing means of said storage means to selectively transduce the recordings thereof into still visual images on said image viewing means whereby the first and second servomotors operate to position said scanner over individual document recordings and whereby the video output from the scanner is gated to selected monitor stations when the scanner is positioned over selected recordings, the output from the scanner being stored in the storage means at the monitor stations to which the output is gated.

14. A searching system for automatically locating selected ones of a plurality of video recordings comprising in combination with a plurality of monitor stations each having an image viewing means in the form of a cathode ray storage tube having an input for video signals for modulating the write beam thereof and for creating a visual image on the screen of said tube, an information storage system comprising a conveying means for a plurality of video recordings arranged in parallel columns and rows on said conveying means, at least one transducer scanner, a guide means for guiding said scanner in movement in a predetermined path across said columns of recordings and in a path parallel to the surface of said conveying means, means for driving said conveying means to move said recordings at substantially constant speed past said transducer scanner, a servomotor means operatively connected to said scanner for moving it along said predetermined path, a control for said servomotor means, a homing position defined by said guide means, switch means for connecting the output of said scanner with the input to said storage tube, means for prepositioning said scanner at said homing position, means for operating the control for said servomotor means to move said scanner from said homing position and preposition it in alignment with a selected recording column, means for operating said scanner to scan a recording of the column with which it is aligned and means for gating to said monitor station the signal generated while scanning a predetermined selected recording as the conveying means moves past said scanner, said gating means comprising means normally open but responsive to the scanning of a designated video recording to close and connect the output from the scanner to a selecting one of the plurality of monitors whereby each monitor has applied to it from said scanner the video signals representing only the video recording selected to be viewed on said scanner, and means for applying said signal to modulate the write beam of said storage tube and to create an image on the screen thereof.

References Cited in the file of this patent

UNITED STATES PATENTS

| | | |
|---|---|---|
| 2,021,705 | Thomas | Nov. 19, 1935 |
| 2,031,075 | Schiebell | Feb. 18, 1936 |
| 2,137,157 | Crudo | Nov. 15, 1938 |
| 2,167,459 | Long | July 25, 1939 |
| 2,214,468 | Lannerd | Sept. 10, 1940 |
| 2,295,000 | Morse | Sept. 8, 1942 |
| 2,354,199 | Collins | July 25, 1944 |
| 2,575,714 | Johnson | Nov. 20, 1951 |
| 2,674,728 | Potter | Apr. 6, 1954 |
| 2,680,239 | Daniels et al. | June 1, 1954 |
| 2,713,609 | Niklason | July 19, 1955 |
| 2,722,676 | Begun | Nov. 1, 1955 |
| 2,816,259 | Papitto | Dec. 10, 1957 |
| 2,832,841 | Eldridge | Apr. 29, 1958 |
| 2,923,921 | Shapin | Feb. 2, 1960 |